US010885167B1

(12) United States Patent
Lador et al.

(10) Patent No.: US 10,885,167 B1
(45) Date of Patent: Jan. 5, 2021

(54) INTRUSION DETECTION BASED ON ANOMALIES IN ACCESS PATTERNS

(71) Applicants: Shir Meir Lador, Hod HaSharon (IL); Gleb Keselman, Hod HaSharon (IL); Noa Haas, Hod HaSharon (IL); Liron Hayman, Hod HaSharon (IL); Yaron Sheffer, Hod HaSharon (IL); Tzvika Barenholz, Hod HaSharon (IL); Noah Eyal Altman, Hod HaSharon (IL); Shimon Shahar, Hod HaSharon (IL); Asaf Brill, Hod HaSharon (IL)

(72) Inventors: Shir Meir Lador, Hod HaSharon (IL); Gleb Keselman, Hod HaSharon (IL); Noa Haas, Hod HaSharon (IL); Liron Hayman, Hod HaSharon (IL); Yaron Sheffer, Hod HaSharon (IL); Tzvika Barenholz, Hod HaSharon (IL); Noah Eyal Altman, Hod HaSharon (IL); Shimon Shahar, Hod HaSharon (IL); Asaf Brill, Hod HaSharon (IL)

(73) Assignee: Intuit Inc., Mountain View, CA (US)

(*) Notice: Subject to any disclaimer, the term of this patent is extended or adjusted under 35 U.S.C. 154(b) by 197 days.

(21) Appl. No.: 16/119,339

(22) Filed: Aug. 31, 2018

(51) Int. Cl.
*G06F 21/00* (2013.01)
*G06F 21/31* (2013.01)
*G06N 5/04* (2006.01)
*G06F 21/55* (2013.01)
*G06N 20/00* (2019.01)

(52) U.S. Cl.
CPC .......... *G06F 21/316* (2013.01); *G06F 21/552* (2013.01); *G06N 5/046* (2013.01); *G06N 20/00* (2019.01)

(58) Field of Classification Search
CPC .... G06F 21/316; G06F 21/552; G06F 21/554; G06N 20/00; G06N 5/046; H04L 63/1458; H04L 63/1425; H04L 63/1416; H04L 63/1408; H04L 63/1433
See application file for complete search history.

(56) References Cited

U.S. PATENT DOCUMENTS

| 9,800,596 B1* | 10/2017 | Chiles | H04L 67/306 |
| 2016/0065604 A1* | 3/2016 | Chen | G06F 21/6227 726/23 |
| 2016/0241578 A1* | 8/2016 | Mahler | H04L 41/147 |
| 2017/0220801 A1* | 8/2017 | Stockdale | H04L 63/1425 |

* cited by examiner

Primary Examiner — Yogesh Paliwal
(74) Attorney, Agent, or Firm — Ferguson Braswell Fraser Kubasta PC

(57) ABSTRACT

A method for detecting an unauthorized activity on a computer system involves obtaining current time stamps for a first type of access event related to the computer system, determining a current count of the first type of access event using the current time stamps, and predicting an expected count of the first type of access event using a current count of time stamps and a predictive model. The method further involves obtaining an actual count of the first type of access event, executing a first comparison of the actual count with the expected count, determining, based on a test comprising the first comparison, that the unauthorized access to the computer system occurred, and issuing an alert indicating the unauthorized activity occurred.

16 Claims, 12 Drawing Sheets

|  | service_id | action | _time |
|---|---|---|---|
| 22252700 | service #18 | action #1 | 2017-10-01 00:00:02 |
| 22252724 | service #22 | action #2 | 2017-10-01 00:00:01 |
| 22252725 | service #23 | action #3 | 2017-10-01 00:00:01 |
| 22252729 | service #43 | action #1 | 2017-10-01 00:00:01 |
| 22252730 | service #55 | action #5 | 2017-10-01 00:00:01 |

300 Log

INTRUSION DETECTION BASED ON ANOMALIES IN ACCESS PATTERNS

BACKGROUND

Network servers may be desirable targets for attackers. Once compromised by an attacker, a network server may be used by the attacker to access potentially valuable and/or confidential data stored on the network server or on connected servers. The longer such an attack goes undetected, the more data may be accessed in an unauthorized manner. To limit the impact of a compromised server, it may, thus, be desirable to detect an attack as early as possible.

SUMMARY

In general, in one aspect, one or more embodiments relate to a method for detecting an unauthorized activity on a computer system, comprising: obtaining a plurality of current time stamps for a first type of access event related to the computer system; determining a current count of the first type of access event using the plurality of current time stamps; predicting an expected count of the first type of access event using a current count of time stamps and a first predictive model; obtaining an actual count of the first type of access event; executing a first comparison of the actual count with the expected count; determining, based on a test comprising the first comparison, that the unauthorized access to the computer system occurs; and issuing an alert indicating the unauthorized activity occurs.

In general, in one aspect, one or more embodiments relate to a system for detecting an unauthorized activity in a data repository, the system comprising: a computer processor; and a monitoring service executing on the computer processor configured to: obtain a plurality of current time stamps for a first type of access event related to the data repository; determine a current count of the first type of access event using the plurality of current time stamps; predict an expected count of the first type of access event using a current count of time stamps and a first predictive model; obtain an actual count of the first type of access event; execute a first comparison of the actual count with the expected count; determine, based on a test comprising the first comparison, that the unauthorized activity in the data repository occurs; and issuing an alert indicating the unauthorized access occurs.

In general, in one aspect, one or more embodiments relate to a non-transitory computer readable medium including computer readable program code for causing a computer system to: obtain a plurality of current time stamps for a first type of access event related to the computer system; determine a current count of the first type of access event using the plurality of current time stamps; predict an expected count of the first type of access event using a current count of time stamps and a first predictive model; obtain an actual count of the first type of access event; execute a first comparison of the actual count with the expected count; determine, based on a test comprising the first comparison, that the unauthorized access to the computer system occurs; and issue an alert indicating an unauthorized activity occurs.

Other aspects of the invention will be apparent from the following description and the appended claims.

BRIEF DESCRIPTION OF DRAWINGS

FIG. 3 shows an example log, in accordance with one or more embodiments of the disclosure.

DETAILED DESCRIPTION

Figure 1A:
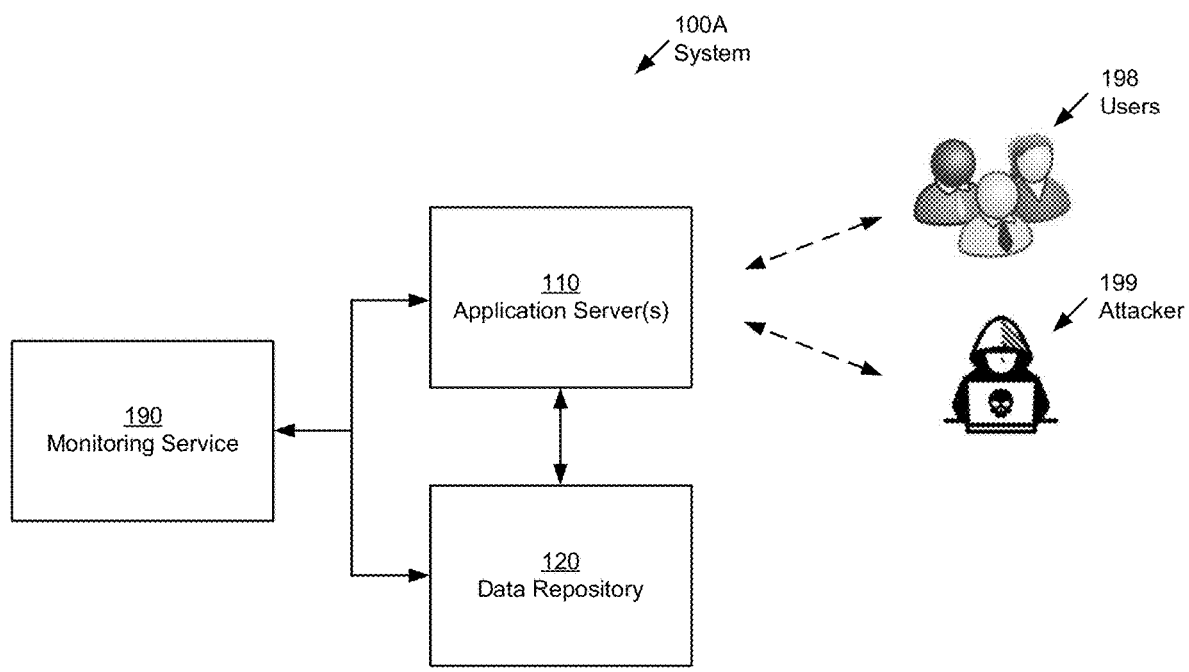
FIGS. 1A, 1B, and 1C show systems, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide methods and systems for intrusion detection based on anomalies in access patterns for stored data. In networked computing systems, network servers may be desirable targets for attackers. Once compromised by an attacker, a network server may be used by the attacker to perform one or more unauthorized activities such as accessing potentially valuable and/or confidential data stored on the network server or on connected servers (including reading, writing, and/or editing the confidential data), unauthorized testing, unauthorized migration, etc. The longer such an attack goes undetected, the more unauthorized activities may be performed. To limit the impact of a compromised server, it may, thus, be desirable to detect an attack as early as possible. Such a detection may be based on unusual patterns of activity. Many of the unauthorized activities include (e.g., as one or more steps) accessing data. Accordingly, data access patterns may be monitored in order to detect one or more unauthorized activities have occurred. More specifically, in one or more embodiments of the disclosure, typical access patterns as they occur during regular operation of the computing system are identified. The patterns may include, for example, seasonal patterns, patterns that are specific to particular software applications, correlations between different patterns, etc. These and other patterns are discussed below with reference to various examples. Deviations from these identified access patterns may indicate an unauthorized access of data. In one or more embodiments, typical access patterns are learned, e.g., by a machine learning model. Based on the learned access patterns, deviating access patterns may then be identified to detect unauthorized access. Various system configurations that may be used in conjunction with such detection methods are subsequently introduced.

Turning to FIG. 1A, a system (100A) in accordance with one or more embodiments is shown. The system may include one or more application servers (110), a data repository (120) and a monitoring service (190). Each of these components is subsequently described. The system may be accessed by users (198), but also by an attacker (199) gaining unauthorized access to the system.

The application server (110), in accordance with one or more embodiments of the disclosure, provides access to data stored in the data repository (120). The application server may provide one or more software applications (not shown) to the users (198). One or more application servers may exist, and one or more software applications may be provided to the users by the application server(s) of the system (100A). An application server may be based on a computing system such as the computing system discussed with reference to FIGS. 10A and 10B.

The data repository (120), in accordance with one or more embodiments of the disclosure, stores data obtained from or by the software application(s) hosted on the application server (110). The data may include sensitive and/or valuable information. For example, the data may be user data including user names, passwords, other access credentials, financial information, healthcare information, etc. The user data may be structured by using separate records, e.g., one for each user. Such a record may include user-specific fields, e.g., a user name, a user address, a user social security number, etc. Those skilled in the art will appreciate that the data may include any type of data. Data may be stored in the form of text, numbers, documents including text, image, audio, and/or video documents.

The data repository (120) may be implemented using any format suitable for the storage of data. The data repository (120) may reside in non-volatile or volatile memory, e.g., on a hard disk drive or in RAM. The data repository (120) may be local or remote to the server (110), the data repository (120) may be cloud-located and/or the data repository (120) may be distributed. The data repository (120) may be based on a computing system such as the computing system discussed with reference to FIGS. 10A and 10B.

In one or more embodiments, an access event is a read, write, edit, and/or a delete operation, a change properties (e.g. access permissions) and/or an execute operation, for any data item in the data repository (120). Access events may be grouped or categorized by type, and a single access event may belong to multiple types. For example, all read operations may correspond to a type of access event. As another example, all read operations performed by software application X may be categorized as a different type of access event. As yet another example, all read operations performed by software application X and/or associated with the user having IP address Z or key K and/or associated with application server Y may be categorized as yet a different type of access event. As yet another example, read/write operations for a specific record or field in the data repository (120), and only that record or field, may correspond to a type of access event.

The monitoring service (190), in accordance with one or more embodiments of the disclosure, includes a set of machine-readable instructions (stored on a computer-readable medium) which when executed enable the detection of intrusions based on anomalies in access patters for data stored in the data repository (120). The monitoring service (190) in accordance with one or more embodiments of the disclosure monitors access to the data repository (120). Such access (e.g., a data retrieval), while typically caused by a user (198) operating a software application executing on the application server (110) may also be a result of an attacker (199) having gained unauthorized access to the system. The monitoring service, in accordance with one or more embodiments of the disclosure, records access events and uses machine learning to recognize typical access patterns but also abnormal access patterns as they may be caused by the attacker (199) attempting to access data. A configuration of the monitoring service (190) is described below with reference to FIG. 2, and operations performed by the monitoring service are described with reference to FIGS. 4, 6 and 8. The monitoring service may be hosted on a computing system such as the computing system discussed with reference to FIGS. 10A and 10B.

The components of the system (100A), i.e., the application server (110), the data repository (120) and the monitoring service (190) may communicate using any combination of wired and/or wireless communication protocols. In one embodiment of the disclosure, the server (110), the data repository (120) and the monitoring service (190) communicate via a wide area network (e.g., over the Internet), and/or a local area network (e.g., an enterprise network). The communication between the components of the system (100) may include any combination of secured (e.g., encrypted) and non-secure (e.g., un-encrypted) communication. The manner in which the components of the monitoring system (100) communicate may vary based on the implementation of the disclosed embodiments.

Figure 1B:
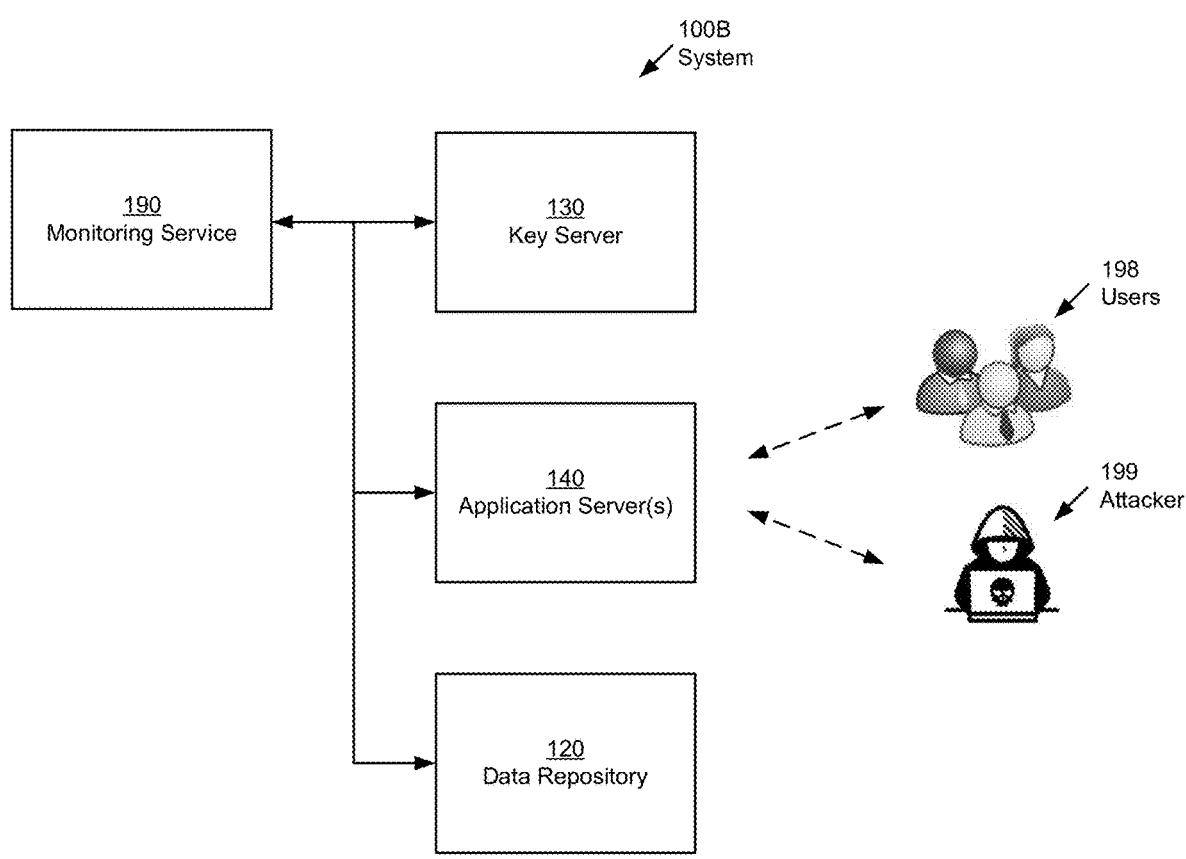

Turning to FIG. 1B, a system (100B) in accordance with one or more embodiments is shown. The system of FIG. 1B includes a key server (130), in addition to the components previously introduced with reference to FIG. 1A. The data stored in the data repository (120) may be encrypted using keys stored by the key server (130). Accordingly, to access data, a software application hosted on the application server (140) may be required to obtain a key from the key server (130). The key server (130), may store keys that are either temporary or permanent. A key may be individually generated for each data value of the data, or a key may be used for multiple data values. Individual keys may be separately generated, or they may be based on a root key from which the individual keys are subsequently derived, e.g., by combining the root key with an additional value. Those skilled in the art will recognized that any type of cryptographic key, including symmetric and asymmetric, single-use and permanent keys may be used without departing from the disclosure. While the introduction of keys using the key server (130) provides an additional layer of security, an attacker (199) having compromised an application server (140) which is trusted by the key server (130) may, nevertheless, be able to access data stored in the data repository (120).

Figure 1C:
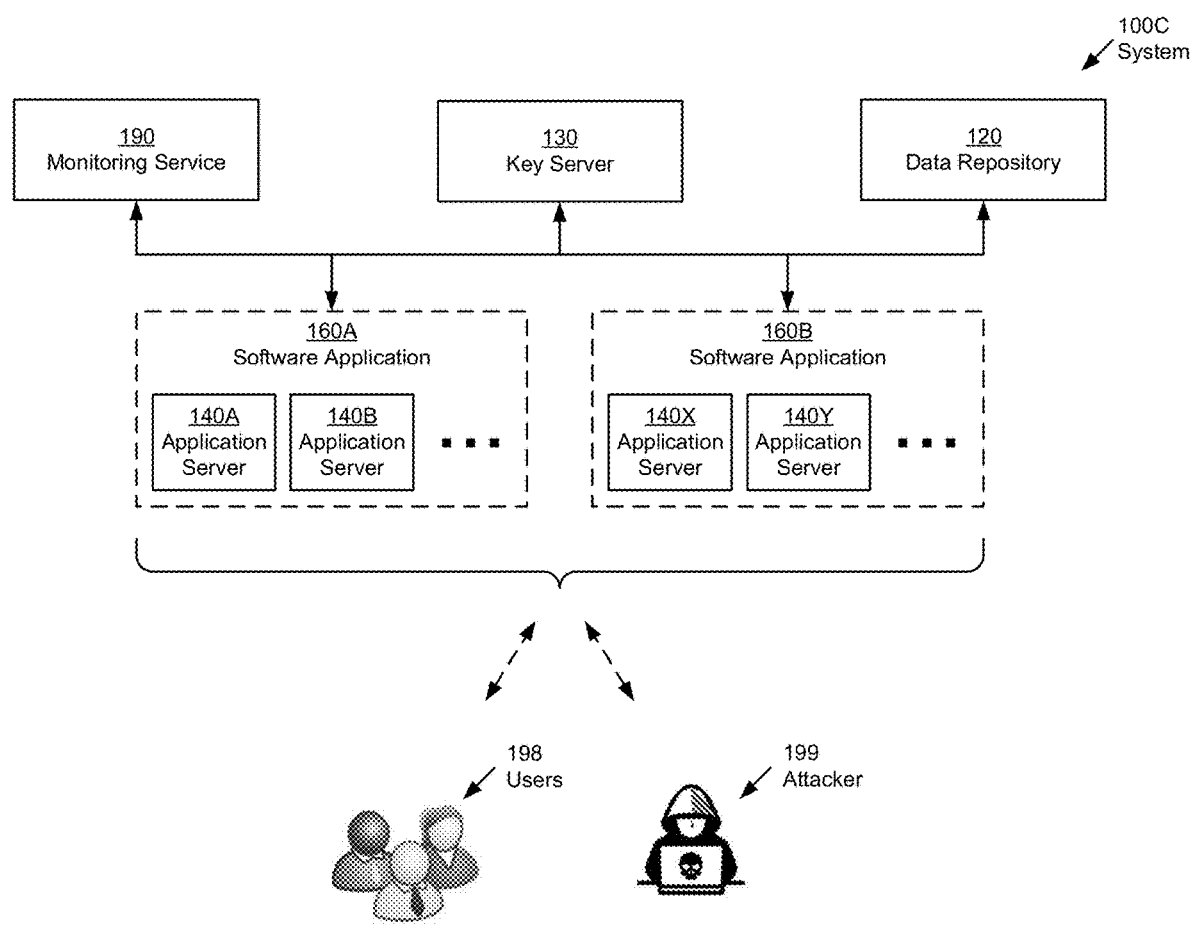

Turning to FIG. 1C, a system (100C) in accordance with one or more embodiments is shown. The system of FIG. 1C extends the configuration introduced in FIG. 1B. Specifically, in FIG. 1C, various software applications (160A, 160B) are served to users (198). Each of these software applications may be provided by multiple application servers (140A, 140B, 140X, 140Y). Multiple servers may be set up to support a large volume of users, to provide the software applications to different geographical regions, etc. In one or more embodiments of the disclosure, each of the application servers (140A, 140B, 140X, 140Y) is trusted by the key server (130), and accordingly each of the application servers is able to obtain keys to decrypt data stored in the data repository (120). Accordingly, even if only a single application server is affected by a security breach, an attacker (199) may still access some or all data stored in the data repository (120).

While FIGS. 1A, 1B, and 1C show configurations of components, other configurations may be used without departing from the scope of the disclosure. For example, various components may be combined to create a single component. As another example, the functionality performed by a single component may be performed by two or more components that may be communicatively connected using a network connection.

Figure 2:
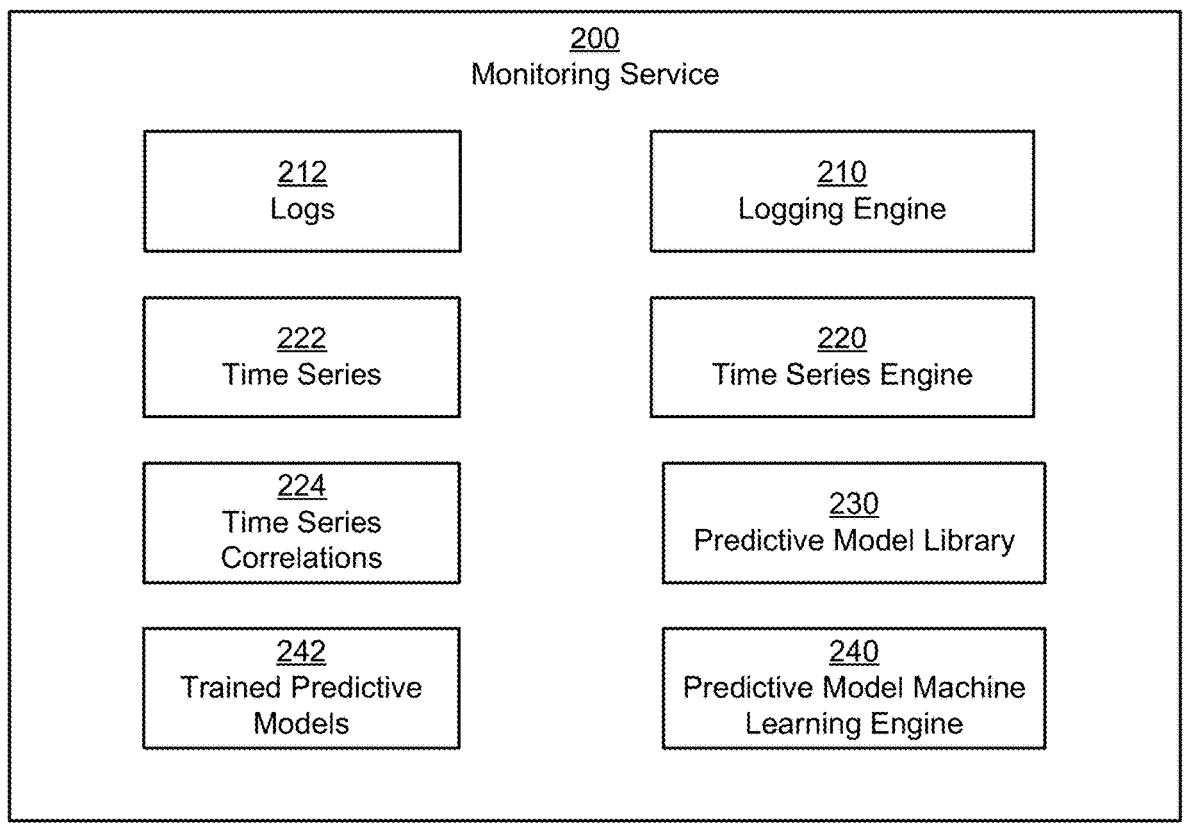
FIG. 2 shows a monitoring service, in accordance with one or more embodiments of the disclosure.

Turning to FIG. 2, various components of the monitoring service (200) are shown. The monitoring service (200) may be essentially the same as the monitoring service (190), discussed above in reference to FIG. 1A, FIG. 1B, FIG. 1C. Each of these components is subsequently described.

A logging engine (210), in accordance with one or more embodiments of the disclosure, is configured to generate logs (212) recording/memorializing access events associated with the data repository (120). The logs (212) may include one or more attributes of the access event. For example, the logs (212) may include a timestamp for each access event, the IP address of the user associated with each access event, the software application that initiated the access request, the server that initiated the access request, etc. Access events may be identified in various ways, depending on the configuration of the system (100A, 100B, 100C). For example, in FIG. 1A, the logging engine (210) may be communicatively connected to the data repository (120) to detect access requests by the application server (110) (e.g. read requests) for data stored in the data repository. Alternatively, in the configurations shown in FIGS. 1B and 1C, the logging engine (210) may indirectly detect access requests in conjunction with the key server (130) by monitoring the requests by the application server(s) (110) for keys from the key server (130).

In one or more embodiments of the disclosure, the logging engine (210) is isolated from the application server(s) (140). Accordingly, a compromised application server may not impair the operation of the logging engine (210). In one or more embodiments of the disclosure, the logging engine (210) is further configured to obtain data from external sources. External sources may be other system logs, user logins, clickstream data, etc.

A time series engine (220), in accordance with one or more embodiments of the disclosure, is configured to generate one or more time series for one or more types of access events by accessing the logs (212). In one or more embodiments of the disclosure, a time series for a type of access event is generated based on the time stamps for all access events belonging to the type. Specifically, a time series is a set of time intervals and each time interval has a count. The count of a time interval is the number of access events with time stamps falling with the time interval. The time interval may also be referred to as a bin and the time series is comparable to a histogram. The time intervals may be consecutive and non-overlapping. Additionally or alternatively, some time intervals may overlap. Examples of time series are provided in FIG. 5, and an in-depth discussion of time series, the construction of these time series, and their use is provided below with reference to FIG. 4.

In one or more embodiments of the disclosure, time series correlations (224) may further be calculated from the time series (222). Autocorrelation or partial autocorrelation functions may be used to determine time series correlations. Accordingly, even if two correlated time series have a temporal offset, the correlation would be captured. A time series correlation (224) between two time series may be represented by a single value to indicate the degree of correlation between these time series, or a correlation may be computed repeatedly over time to represent how correlation between the two time series changes over time, thereby making the time series correlation a time series itself. The computation of time series correlations is described below with reference to FIG. 4.

A predictive model library (230), in accordance with one or more embodiments of the disclosure, contains a variety of predictive models that are suitable for modeling and predicting time series. These predictive models might or might not require training prior to being used for making predictions. One or more of the predictive models in the predictive model library (230) may be used to predict future data points based on available historical data points of time series as discussed with reference to FIG. 8. Examples for predictive models that may be stored in the predictive model library (230) include, but are not limited to, simple average or median models, moving average models, weighted average models, linear regression models, Holt's linear trend method, autoregressive (AR) models, autoregressive moving average (ARMA) models, autoregressive integrated moving average (SARIMA) models, nonlinear time series models, artificial neural networks including recurrent neural networks such as long short term memory models, extreme gradient boosting (XGboost), k nearest neighbors (KNN), and support vector machines (SVM).

A predictive model machine learning engine (240), in accordance with one or more embodiments of the disclosure, is configured to train one or more of the predictive models obtained from the predictive model library (230) as described with reference to FIG. 6. The training algorithms that are used may be specific to the predictive model being trained. Accordingly, the predictive model machine learning engine (240) may include a variety of different training algorithms such as, for example, a linear regression, a Huber regression, a lasso regression, a ridge regression, elastic nets, etc. These training algorithms may operate on training data obtained from the time series (222) to optimize a cost function and thus improve the predictive accuracy of the trained predictive model using validation data. The training of a predictive model to be used to perform an actual time series prediction is described in detail with reference to FIG. 6. The predictive model to be used to perform a time series prediction may be stored by the monitoring service as a trained predictive model (242). Multiple trained predictive models that may be applied to different time series may be stored, as discussed with reference to FIG. 6.

Turning to FIG. 3, a section of an example log in accordance with one or more embodiments of the disclosure is shown. The example log includes five entries. Each of these entries occupies a row of the log and may be a result of an access event that was logged. For each logged access event, the log includes attributes. These attributes may include an identifier (ID) for the software application responsible for the logged access event (service_id), an identifier for the action having been logged (action—e.g., a read operation, a key request, etc.), and a time stamp (_time). Unique identifiers may be used for each software application and/or each action to ensure that a logged access event can be unambiguously characterized. Text, numbers or alphanumeric codes may be used as identifiers. Various temporal resolutions may be configured for the time stamps. For example, a time stamp may include a date, hours minutes, and/or seconds. Depending on resolution requirements, any unit may be used for the time stamp. A counter rather than an actual time may alternatively be used.

In one or more embodiments of the disclosure, the attributes of access events that are recorded in the log (300) are configurable and may depend on the system architecture and configuration and the desired monitoring capabilities. For example, a user ID, a process ID, and/or a server ID may be logged in addition to or as an alternative to the attributes shown in FIG. 3. Any observable access event may be used as a trigger to cause a log entry, and any information associated with the access event may be stored as an attribute in the log.

While the log (300) may have been generated by the logging engine (210), other logs may be externally obtained. For example, the software applications executing on the application servers may produce logs that may be shared with the logging engine (210), the software applications themselves may produce logs, etc. User logins, clickstream data and any other type of historical data may thus be documented.

Figure 4:
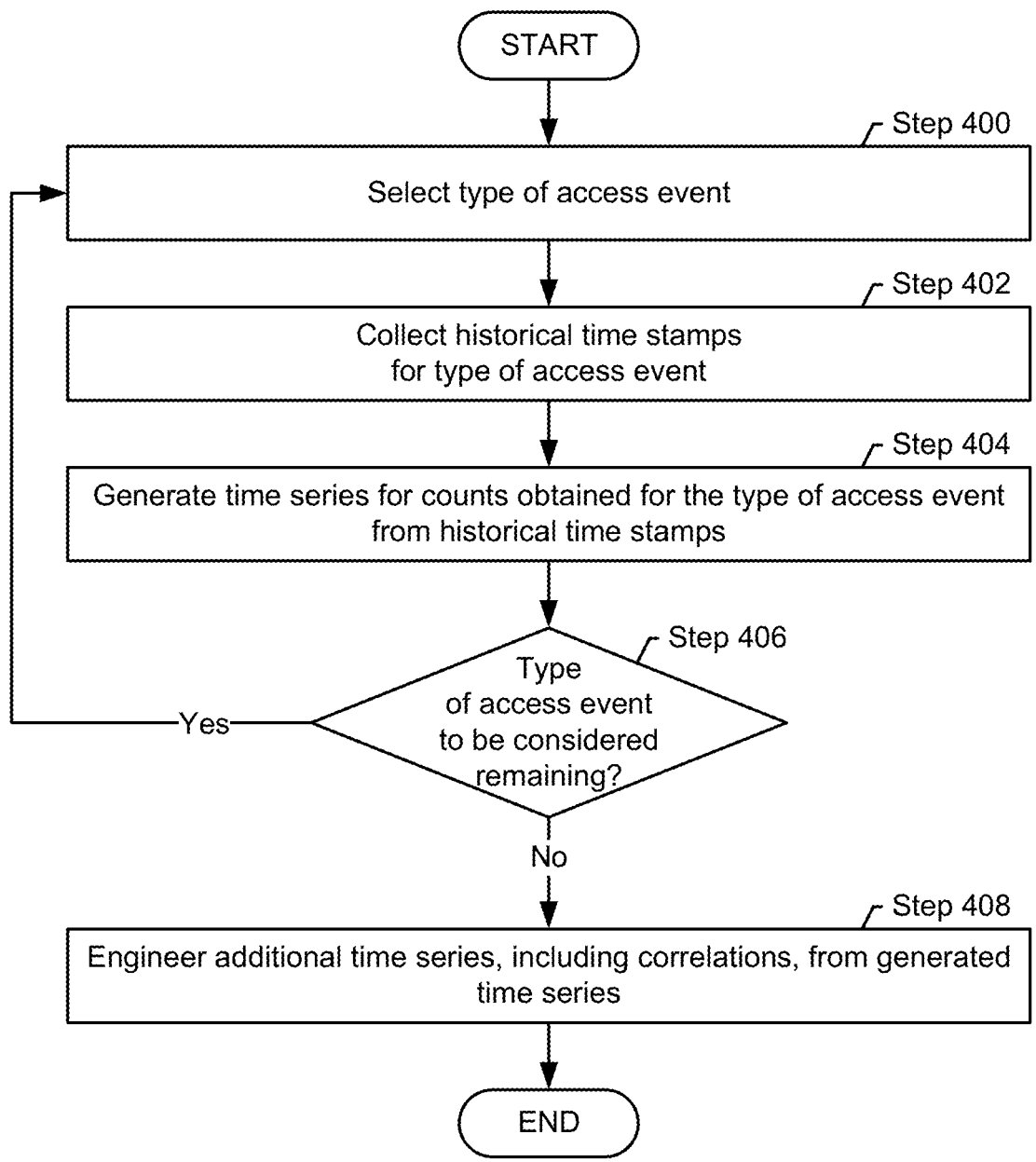
FIG. 4 shows a flowchart describing the obtaining of time series from logs, in accordance with one or more embodiments of the disclosure.
Figure 6:
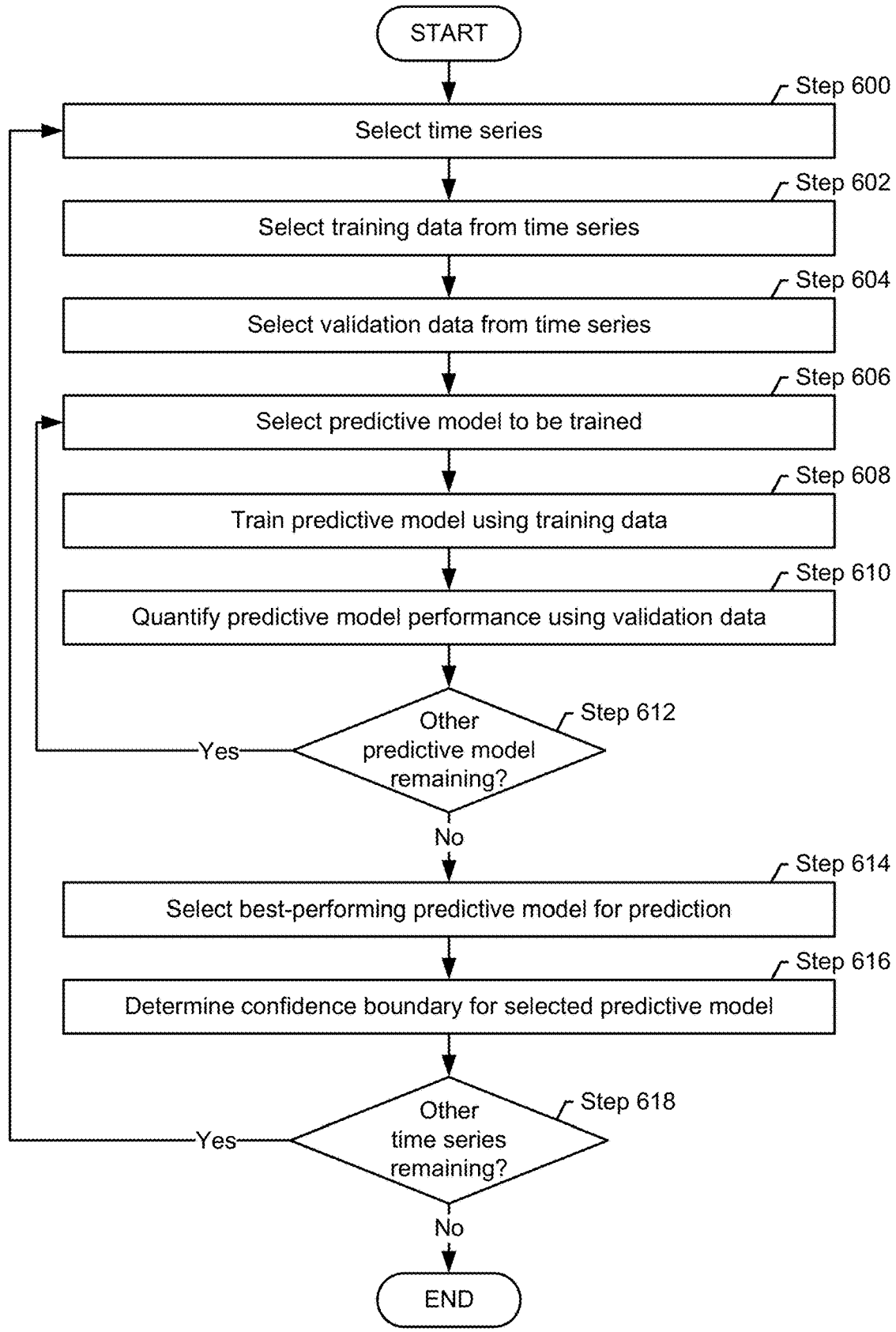
FIG. 6 shows a flowchart describing the obtaining of predictive models, in accordance with one or more embodiments of the disclosure.
Figure 8:
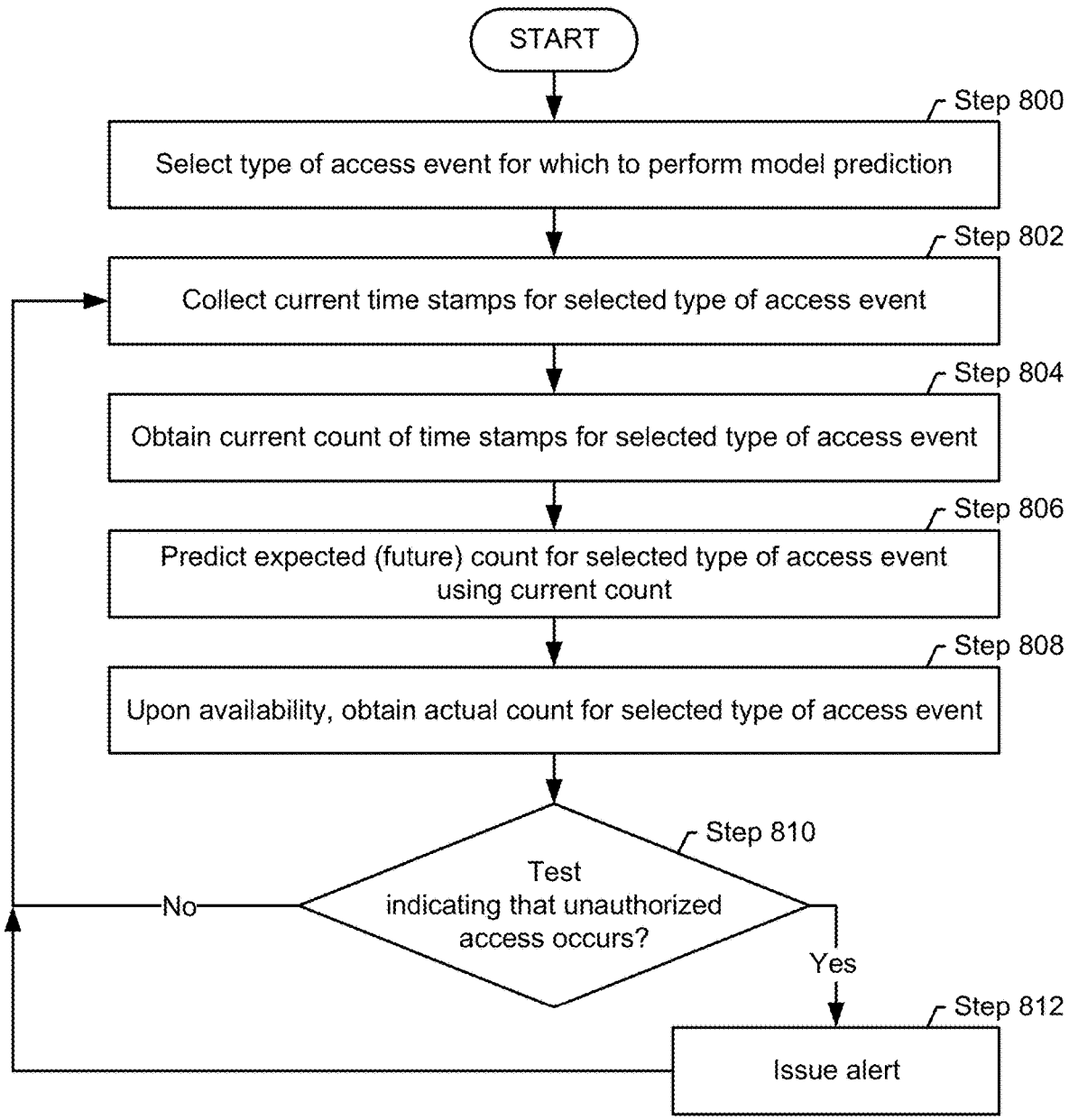
FIG. 8 shows a flowchart describing the use of predictive models to detect unauthorized access of data, in accordance with one or more embodiments of the disclosure.

FIGS. 4, 6 and 8 show flowcharts in accordance with one or more embodiments of the disclosure. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 4, a method for obtaining time series, in accordance with one or more embodiments of the disclosure, is shown. The method may be continuously executed to ensure that the time series capture access events based on the most recent obtainable time stamps. Alternatively, the method may be periodically executed, e.g., controlled by a scheduler. For example, if the training of predictive algorithms, described with reference to FIG. 6, is performed once per day, the method of FIG. 4 may also be performed once per day. Example time series obtained as described in FIG. 4 are subsequently shown in FIG. 5.

In Step 400, a type of access event is selected. A type of access event, in accordance with one or more embodiments of the disclosure, may be any kind of access event that is considered sufficiently significant to be logged. One type of access event may be a read operation. Another type of access event may be a write, delete, edit, change properties or execute operation. Each occurrence of such an operation may count as an access event and may be documented along with a time stamp. Additionally or alternatively, the type of access event may be based on other attributes that differentiate operations of the same type. For example, a type of access event may be read operations that target specific data values (e.g., names, addresses, social security numbers, credit card numbers, bank account numbers, passwords, etc.). As another example, a type of access event may be write operations initiated by a particular user, by a particular server, by a particular service, by a particular process, and/or by a particular software application. Many different types of access events may thus be defined with different levels of granularity (e.g., all read operations vs. only read operations initiated by a particular user and targeting social security numbers). Types of access events may be selected such that they allow or facilitate distinction of the activity associated with an attacker from regular user activity, in the system. In other words, the pattern (e.g., count, frequency or volume) of access events associated with the selected type of access events may differ, depending on whether these access events were a result of regular user activity or attacker activity.

To generate time series for the different types of access events, each of the types of access events may be separately processed as shown in Steps 400-406. While FIG. 4 shows sequential processing via a loop, the processing may occur in parallel without departing from the disclosure. After completion of Steps 400-406 for all selected types of access events, a set of time series, one for each type of access event, may be available for further processing.

In Step 402, the historical time stamps, i.e., time stamps that have previously been recorded for the selected type of access event, are collected from the log. The historical time stamps to be collected may be obtained based on their attributes matching the type of access event. Referring to the example log shown in FIG. 3, assume that historical time stamps for all access events associated with action #1 are to be collected. Accordingly, the historical time stamps associated with the first and the fourth access events (first and fourth row of example log) are collected. Alternatively, assume that historical time stamps are to be collected only for access events that are associated with action #1 but also with service #43. In this case, only the historical time stamp associated with the fourth access event is collected. Any types of attributes may be specified to govern the collection of historical time stamps.

In Step 404, a time series is generated for the historical time stamps obtained in Step 402. The time series may be generated by binning the historical time stamps over set time intervals. For example, a bin may contain all historical time stamps that have occurred within a minute. Other bin sizes, e.g., seconds, hours or days may be used without departing from the disclosure. Each time interval has a count. Bins may be overlapping or non-overlapping. For example, a first non-overlapping bin may be for t=0 seconds to t=60 seconds, a second non-overlapping bin may be for t=60 seconds to t=120 seconds, etc. In contrast, a first overlapping bin may be for t=0 seconds to t=60 seconds, a second overlapping bin may be for t=10 seconds to t=70 seconds, etc. Each of the resulting bins represents a count, volume or frequency of events having occurred within the binning time interval. For example, a bin covering a time interval of one minute may have the value "10", thus indicating that the considered event occurred ten times within the minute represented by the bin. Accordingly, the obtained time series represents the historical counts of events as a series of data points for a selected type of event.

In Step 406, a determination is made about whether another type of event to be considered is remaining. If another type of event is remaining, the execution of the method may continue with Step 400. If no other type of event to be considered is remaining, the method may proceed to Step 408.

Upon reaching Step 408, time series have been generated for all types of events. These time series may be in condition for further use as described in FIGS. 6 and 8.

In Step 408, additional time series may be engineered from the time series that have been obtained in the previously described steps. In one or more embodiments, the number and type of engineered time series may be specified by a system administrator. Engineering a time series, in accordance with an embodiment of the disclosure, includes transforming one of the previously obtained time series to obtain another time series. A transformation may be, for example, a logarithmic, trigonometric or polynomial transformation, a cumulative sum, a trend, a moving average, or broadly speaking, any kind of linear or nonlinear transformation from a first into a second reference frame. Such transformations may be performed for a single time series, but also for multiple time series, e.g., in case of multidimensional time series. Transformations may be beneficial to obtain a different feature space that is more suitable as an input to a predictive model. For example, exponential data may be linearized using a log operation, data provided in increments may be converted to non-incremental data using a cumulative sum operation, etc.

Further, in Step 408, additional time series may be generated by combining two or more of the previously obtained time series. The time series may be combined by addition, subtraction, multiplication, division (e.g., ratios), or any other function. For example, one time series may document the number of read operations. Another time series may document the number of online users. A ratio of these two time series provides the read operations per online user over time. If this ratio has an expected/known range, deviations from this expected/known range may be used to detect unauthorized access.

In one or more embodiments of the disclosure, additional time series are obtained by calculating a correlation between previously obtained time series, i.e., based on historical counts of events obtained for selected event types. A value for correlation (e.g. a correlation coefficient) may be calculated, and if the correlation coefficient is repeatedly calculated (e.g., based on a sliding window), another time series may be formed by the repeatedly calculated correlation coefficients.

In one or more embodiments of the disclosure, the engineering of time series further includes the introduction of time shifts or offsets to a previously obtained time series. The use of a time shift may be particularly applicable to the calculation of correlation between time series. Consider, for example, a time series A and a time series B, which capture the occurrence of events A and B, respectively. Assume that access events A and B are typically causally related with access event A triggering access event B with a delay of approximately one second. If a correlation analysis is performed for time series A and time series B, the detected correlation may be relatively low, due to the temporal one-second offset. However, if time series A and B are realigned prior to performing the correlation analysis, a very high correlation may be found. A typical scenario in which correlated activity may occur is the retrieval of identity-related data. To verify an identity, a social security number may be retrieved, and shortly after, a name and/or address may be retrieved as well, because these elements are required in combination to complete an identify verification.

Figure 5:
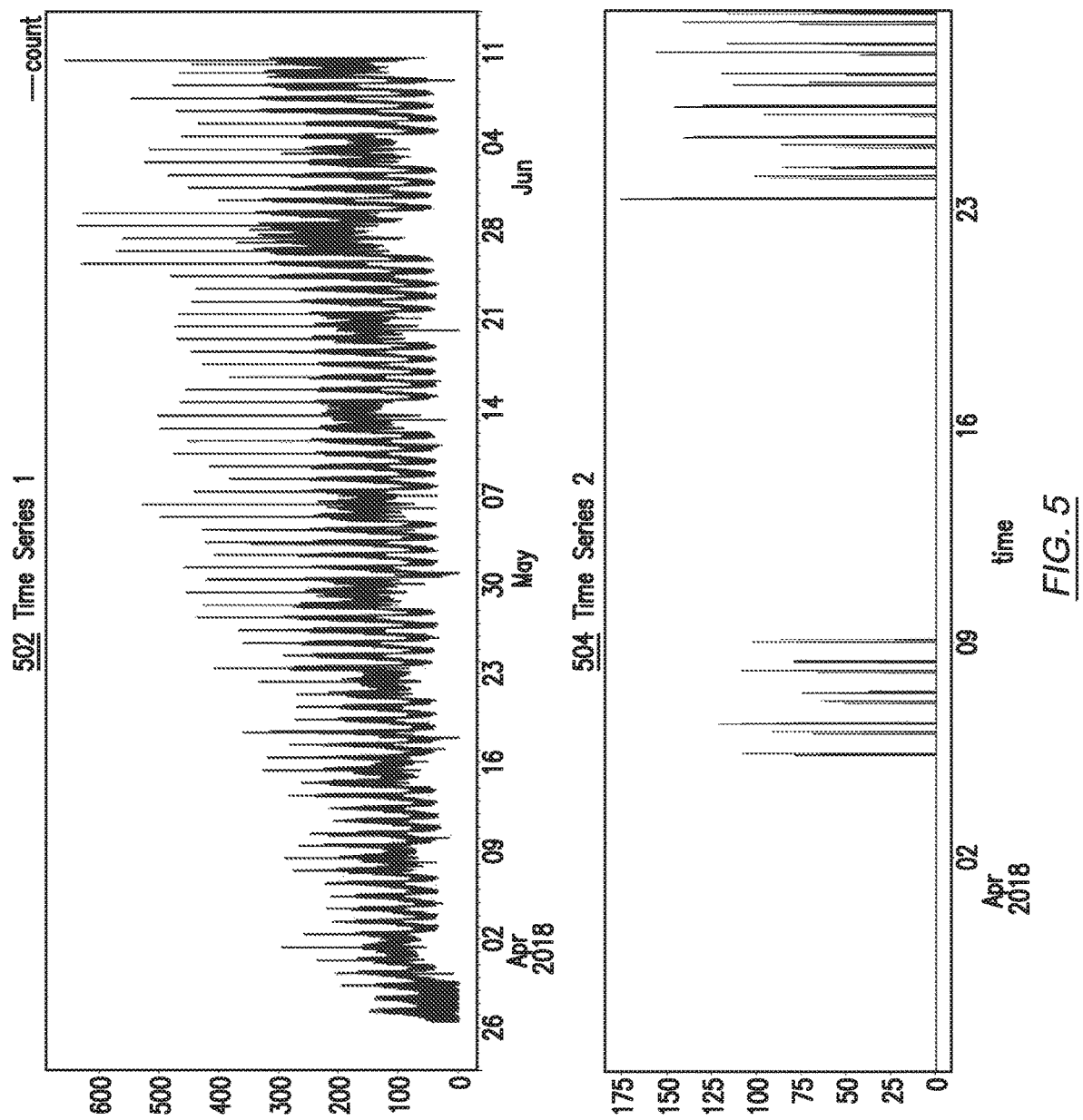
FIG. 5 shows exemplary time series, in accordance with one or more embodiments of the disclosure.

Turning to FIG. 5, example time series (502, 504), obtained as described with reference to FIG. 4, are shown. While time series 1 (502) depicts densely occurring events, times series 2 (504) depicts sparsely occurring events.

Time series may further have periodicities (e.g., seasonal fluctuations). For example, the time series may have annual or monthly highs and lows. These periodicities may be causally related to real-world events such as deadlines (e.g., annual tax-filing deadlines, causing increased counts of events prior to the deadlines), common human behaviors (e.g., humans mostly working during daytime, causing increased counts of events during daytime hours in comparison to nighttime hours), etc. As further discussed with reference to FIGS. 6 and 8, an understanding of these periodicities may help distinguish attacker-caused activity from user-caused activity.

In one or more embodiments of the disclosure, certain features of time series, e.g. periodicities, are specific to particular types of events. For example, a tax software application may show the previously discussed annual increases in counts of events, whereas an accounting software may show monthly increases in counts of events. In one or more embodiments of the disclosure, different types of events are therefore captured using separate time series. While this approach may result in a significant number of time series being generated, it may ensure that unique characteristics are preserved and made available as inputs to predictive models as further discussed below.

Time series may further change over time. For example, the count of events may increase as more users access the system, the pattern of events may change as an updated software application may access data in a different manner, etc.

Time series may also have different temporal resolutions, e.g., seconds, minutes, hours, days, etc., and time series may be available for different time intervals, with some time series potentially providing information about events that have occurred years ago, and others only providing information about more recent events. Accordingly, the subsequently described methods may be designed such that a broad range of time series with very different characteristics can be processed.

Turning to FIG. 6, a method for obtaining a predictive model to be used for monitoring data access patterns using time series, in accordance with one or more embodiments of the disclosure, is shown. The method may be executed when one or more time series become available, e.g., after the execution of the method of FIG. 4. In one embodiment of the disclosure, the method of FIG. 6 is performed on a daily basis. Although the flowchart describes the training of predictive models for multiple time series, the training may alternatively be performed for a single or selected time series only. The method of FIG. 6 may be performed on originally obtained time series (as obtained in Step 404 of FIG. 4), and/or on engineered time series (as obtained in Step 408 of FIG. 4).

In Step 600, a time series is selected for further processing in Steps 602-616. Any time series that was previously generated as described with reference to FIG. 4 may be selected Step 600 (and the subsequent steps) may be repeatedly executed for multiple/all available time series, based on the execution of the method reaching Step 618. In other words, Steps 600-618 establish a loop in which all available time series may be processed as described in Steps 602-616. In one or more embodiments, a time series is selected at random. In one or more embodiments, the time series are ranked and the time series with the highest rank that has not yet been processed is selected next.

In Steps 602 and 604, training data and validation data are obtained from the time series. In one or more embodiments of the disclosure, the time series is split into training data and validation data using a ratio. For example, 80% of the bins of historical time stamps may be used as training data, whereas 20% of the bins of historical time stamps may be used as validation data. The selection of samples (with each sample representing a bin) to be used as training data and validation data from the time series may be performed pseudo-randomly (e.g., by splitting the time series into five consecutive segments and by randomly selecting the bins of one of the five segments as the validation data and by making the bins in the remaining four segments training data), or systematically (e.g., by making the first 80% of bins of historical time stamps the training data and by making the remaining 20% of bins of historical time stamps the validation data).

In Step 606, the predictive model to be trained is selected. Various predictive models may be available, such as simple average or median models, moving average models, weighted average models, Holt's linear trend method models, autoregressive (AR) models, autoregressive moving average (ARMA) models, autoregressive integrated moving average (SARIMA) models, nonlinear time series models, artificial neural networks, extreme gradient boosting (XGboost), k nearest neighbors, support vector machines, and other models that are capable of predicting time series. Any of the available predictive models may be selected. Step 606 (and the subsequent steps 608 and 610) may be repeatedly executed for multiple/all available predictive models, based on the execution of the method reaching Step 612. In other words, Steps 606-612 establish a loop in which all available predictive models may be trained and validated, as described in Steps 608 and 610. In one or more embodiments, predictive models are selected at random for processing. In one or more embodiments, predictive models are ranked and the predictive model with the highest rank that has not yet been processed is selected. For some predictive models, multiple training algorithms are applicable. For example, an AR model may be trained using a basic linear regression, a ridge regression, and various other methods. Accordingly, an appropriate training algorithm may be selected as well. To select a training algorithm, all applicable training algorithms may be used when performing Steps 608 and 610. The best-performing algorithm may then be selected, as described in Step 614.

In Step 608, the selected predictive model is trained using the selected training algorithm and the training data. Those skilled in the art will appreciate that the training may be specific to the type of predictive model and to the type of training algorithm. For example, some training procedures can be completed in a single iteration (e.g., by calculating a mean or median of the training data), whereas other models may be iteratively trained (e.g., using a gradient descent method when performing a ridge regression).

In Step 610, the trained predictive model is evaluated using the validation data. Specifically, the trained predictive model may be executed, and the output may be compared to the actual validation data to assess the accuracy of the predictive model output. The predictive performance of the predictive model is thus quantified. Measures such as the root mean-squared-error, confidence intervals, etc. may be used to quantify the predictive performance.

In Step 612, a determination is made about whether another predictive model to be trained is remaining. If another predictive model is remaining, the execution of the method may proceed with Step 606 to repeat the model training and validation for the next selected predictive model. If no other predictive model is remaining, the method may proceed to Step 614.

Upon reaching Step 614, all available suitable predictive models (in combination with all available training algorithms, if multiple training algorithms are available) may have been trained and validated for the selected time series. In Step 614, the best-performing predictive model is selected to be used for performing time series predictions as described with reference to FIG. 8. The selection may be performed based on the quantification of the predictive model performance, obtained in Step 610.

In Step 616, a confidence boundary is established for the selected predictive model. In one or more embodiments of the disclosure, the confidence boundary is relied upon by the method described in FIG. 8 to detect anomalies in data access patterns. Because the training and validation data are based on regular users accessing the system, and with no known attackers being present, the assumption that the training and validation data is purely governed by regular user data is made, in accordance with one or more embodiments of the disclosure. The confidence boundary may, thus, be set such that none of the samples of the training and/or validation data cross the confidence boundary. Exceeding the confidence boundary during use of the predictive model as shown in FIG. 8 would then be an indication of unusual data access patterns that may have been caused by an attacker. In one or more embodiments of the disclosure, the confidence boundary is set as a multiple of the confidence interval obtained in Step 610 or alternatively may be derived from other measures used to quantify the predictive performance. For example, a multiplier may be applied to the confidence interval around the predicted validation data, such that the actual validation data remains within the confidence boundary. The confidence boundary is, thus, specific to the training/validation data. If the training/validation data are relatively predictable, a narrower confidence boundary may be set, and if the training/validation data are less predictable, a wider confidence boundary may be set. A safety margin may further be applied to avoid false positives during the execution of the method of FIG. 8.

In Step 618, a determination is made about whether other time series are remaining, for which the described training of predictive models may be performed. If another time series is remaining, the execution of the method may proceed with Step 600. If no more time series is remaining, the execution of the method may terminate. The entire method of FIG. 6 or parts of the method of FIG. 6 may re-execute as new time series data become available.

After completed execution of the method shown in FIG. 6, the best-performing predictive model for each time series that has been processed may have been obtained. In one or more embodiments of the disclosure, a trained predictive model intrinsically represents the characteristics of the time series that it was trained on. The predictive model may thus be able to predict future data points of the time series based on available current and/or past data points of the time series. These predictions may include, for example, seasonal fluctuations at various time scales, noise characteristics, etc. These trained predictive models may subsequently be used for predictions as described in FIG. 8. More specifically, each of these trained predictive models may be used to predict an expected count of events based on an observed current count of events. A trained predictive model may predict the expected count of events for a time interval located at time $t=T_1$ (where $T_1$ is in the future) based on either a single current bin for the count of events located at $t=T_0$ (where $T_0$ is the current time) or for multiple consecutive bins, e.g., for bins located at $t=T_0, T_{-1}, T_{-2}, \ldots$ (where $T_{-1}, T_{-2}$ are in the past) i.e., also including bins from the past. Any combination of present and past bins may be considered by the trained predictive model, depending on the structure and training of the predictive model.

While FIG. 6 describes the identification of a predictive model based on time series data, other models may be identified without departing from the invention. For example, in one embodiment, a correlation model is obtained. The correlation model may describe the correlation of two time series over a time interval. The correlation model may be a correlation coefficient or any other element that describes the correlations between the considered time series. The time interval considered for the correlation model may depend on the nature of the time series and may range from seconds for time series that change at a rapid pace to years for time series that change gradually, e.g., based on annual fluctuations. Alternatively, a correlation coefficient may be statically set.

Figure 7:
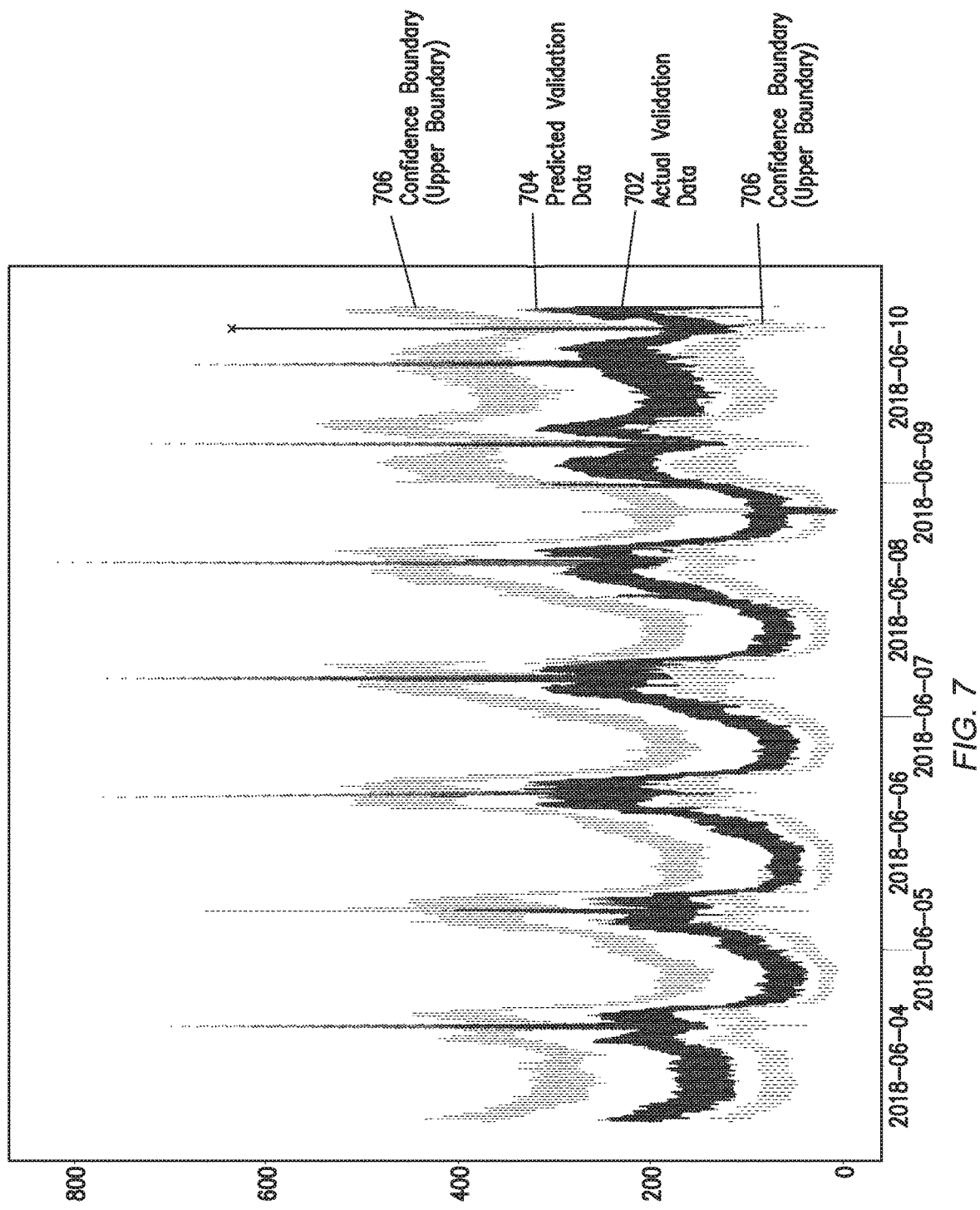
FIG. 7 shows an example outcome of the training of a predictive model, in accordance with one or more embodiments of the disclosure.

FIG. 7 shows an example outcome of the training of a predictive model, as described in FIG. 6. FIG. 7 includes actual validation data (702) (black), predicted validation data (704) (gray) and a confidence boundary (706) (gray). The actual validation data (702) were obtained as described in Step 604 of FIG. 6. Accordingly, the actual validation data (702) consist of a series of data points, each representing a count of historical events that were obtained as described in FIG. 4. The predicted validation data (704) are a result of the execution of Step 610 to assess the performance of the predictive model. The predicted validation data (704) are, thus, outputs of the trained predictive model. FIG. 7 shows an example in which the predicted validation data (704) tracks the actual validation data (702) to some extent, although not perfectly. While major features such as the more significant bursts in the count of events are captured, minor features such as small variations in the count of events are not necessarily present in the predicted validation data (704). Accordingly, the performance of the underlying predictive model may be considered reasonable although not perfect. The confidence boundary (706) is adjusted such that none of the data points of the actual validation data cross the confidence boundary (706).

Turning to FIG. 8, a method for detecting anomalies in data access patterns, in accordance with one or more embodiments of the disclosure, is shown. The detection is based on a prediction of an expected count of events using the trained predictive model. Because the predictive model was trained on data that represent typical data access patterns as they occur as a result of regular user activity, the prediction may be assumed to reflect a future count of events as it would be caused by regular user activity. A deviation of an actual, measured count of events from the expected count of events may, thus, serve as an indication for unusual activity which may be a result of the activities of an attacker.

The method may be repetitively executed to enable a continuous detection of possible attacks. Although the flowchart describes the monitoring of the system based on a single time series (based on a single type of event) and using a single predictive model, the monitoring may be performed using multiple predictive models for multiple types of events, obtained as described in FIG. 6 using multiple time series, to provide a more comprehensive monitoring. Each predictive model may, thus, contribute to the monitoring of the system by providing a prediction. To provide real-time or near-real-time detection of possible attacks, the predictive models may be executed within a short time interval, for example by executing the predictive models in parallel.

In Step 800, a type of event is selected for which the following steps are to be executed. Any type of event may be selected, if a trained model and current time stamps, to be used as an input for the trained model, are available. As previously noted, the method of FIG. 8 may be executed for multiple types of events by selecting these types of events, in Step 800.

In Step 802, current time stamps for the selected type of even are collected. The collecting of the current time stamps may be performed as previously described in Step 402 of FIG. 4. However, unlike in Step 402, the collected time stamps are current rather than historical time stamps. While historical time stamps may be older, the current time stamps may be recent, i.e., no older than a few seconds, minutes or hours, depending on the desired temporal resolution of the prediction to be made. For example, if a predictive model is used that operates on bins representing counts of events at a one-second resolution, the collected time stamps may be obtained for the most recent one-second time interval.

In Step 804, the current count of events is determined using the current time stamps obtained in Step 802. The current count of events may be obtained by binning the current time stamps over the desired time interval. Analogous to Step 402, the current count of events may be based on overlapping or non-overlapping bins.

In Step 806, an expected count of events is obtained. The expected count of events is the predicted future count of events, predicted using the obtained current count of time stamps representing events. Specifically, the trained predictive model may be used to predict, at $t=T_0$ (current time), the expected count of events in a time interval at $t=T_1$ (one time step into the future) using the current count of events. Depending on the structure of the trained predictive model, only the current bin for the count of events (for $t=T_0$) may be used as input to the model, or multiple consecutive bins, e.g. for $t=T_0, T_{-1}, T_{-2}, \ldots$ (i.e., the current and past bins) may be used as the input to the trained predictive model. Obtaining the expected count of events may include computing the confidence boundary for the expected count, using the trained predictive model.

In Step 808, the actual count of events at $t=T_1$ is obtained as the time stamps that count toward the actual count of events become available. The actual count of events is obtained by collecting time stamps and by binning the collected time stamps as previously described.

In one or more embodiments, in scenarios that assess correlations between two time series, in Step 808, actual counts of events are obtained for the two time series, as they become available. Multiple consecutive actual counts may be obtained for the two time series to allow the calculation of an actual correlation.

In Step 810, a test is performed to determine whether an unauthorized access occurs. The test may be performed based on a comparison of the actual count of events and the expected count of events. If the comparison indicates that the actual count of events obtained in Step 808 is within the confidence boundary of the expected count of events obtained in Step 806, it may be concluded that no unauthorized access occurred. Alternatively, if the comparison indicates that the actual count of events is beyond the confidence boundary of the expected count of events, it may be concluded an unauthorized access occurred. The test may be performed for any number of time series, i.e., multiple comparisons may be performed.

The test may further be performed based on whether a certain level of correlation is maintained between two time series. Specifically, the correlation model, obtained as described with reference to FIG. 6, may be used to assess whether the current counts of access events associated with the two time series result in an actual correlation that is in conformity with the correlation model. For example, a correlation value may be calculated considering the current counts of access events, and if this correlation value is above a specified threshold, e.g., no less than a certain percentage of the correlation value specified by the correlation model, it may be concluded that no unauthorized access occurred.

If, in Step 810, it is concluded that an unauthorized access occurred, the method may proceed with the execution of Step 812. Alternatively, if no unauthorized access was found, the method may proceed with the execution of Step 802.

The test of Step 810 may be performed using one or more individual comparisons of expected and actual counts and/or based on any number of correlations, as described above. Such multi-step tests may reduce the risk of false positives and/or may increase the detection of true positives.

In Step 812, an alert is issued. Issuing the alert may include notifying a security specialist or system administrator. In addition or alternatively, the computer system may be blocked, e.g., by preventing access to the data in the data repository. The blocking may be globally applied to the entire computer system, or it may be locally applied, e.g., based on a resource that is responsible for the alert. For example, if the type of event that resulted in the detection of a possible attack is associated with a particular software application, only that software application may be blocked from accessing the computer system, whereas other software applications may continue to operate normally. Similar strategies may be applied to particular servers, particular users, etc.

Figure 9:
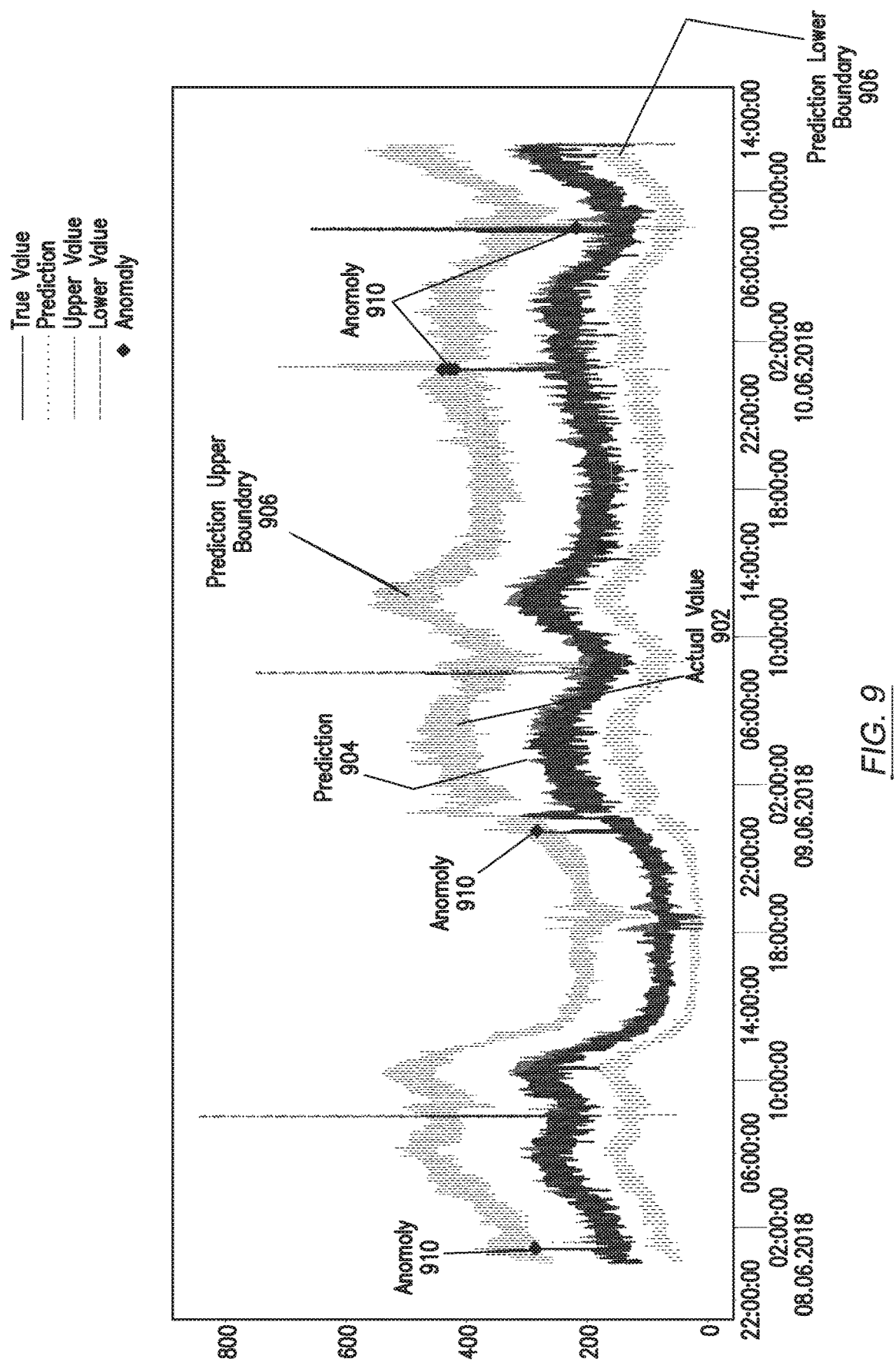
FIG. 9 shows an example time series prediction, in accordance with one or more embodiments of the disclosure.

FIG. 9 shows an example time series prediction in accordance with one or more embodiments of the disclosure. In FIG. 9, both actual values (902), obtained as described in Step 808 of FIG. 8, predicted values (904), and upper and lower prediction boundaries (906), obtained as described in Step 806 of FIG. 8, are shown. At various points in time, the actual values (902) are beyond the prediction boundaries (906), thus indicating anomalies (910), determined as described in Step 810 of FIG. 8.

Various embodiments of the disclosure have one or more of the following advantages. Embodiments of the disclosure enable the detection of anomalies in data access patterns using time series data. The presence of an attacker may thus be detected. The detection is performed using machine learning. A predictive model learns data access patterns and correlations between different data access patterns. Based on these learned patterns, the predictive model provides an expectation for future data points of the data access pattern and recognizes deviations from that expectation, which may indicate the presence of an attacker accessing the data. Any available time series may be considered, and the predictive model may be updated or re-trained whenever new data become available. Accordingly, the predictive model may retain its ability to predict the presence of an attacker, even as data access patterns change over time. Predictive models in accordance with one or more embodiments of the disclosure accommodate different time horizons and temporal resolutions. For example, a time series may include data for multiple years to capture annual data access patterns. Another time series may include data for hours or days only, to capture higher-frequency data access patterns. Changes in the data access patterns may thus be captured regardless of the frequency of these changes, while maintaining a generic model that can accommodate wide variety of time series with different characteristics. Similarly, sparse and dense time series may be processed. Any type of time series that can be derived from logged data may be used by the described methods and systems. Accordingly, embodiments of the disclosure may operate on many time series, thereby capturing a broad variety of data-access related features represented by these time series to enable swift detection of attacker activity. No operator input may be necessary to learn new time series. Embodiments of the disclosure, thus, improve the operation and stability of computing system, in an automated manner requiring minimum human operator attention.

Figure 10A:
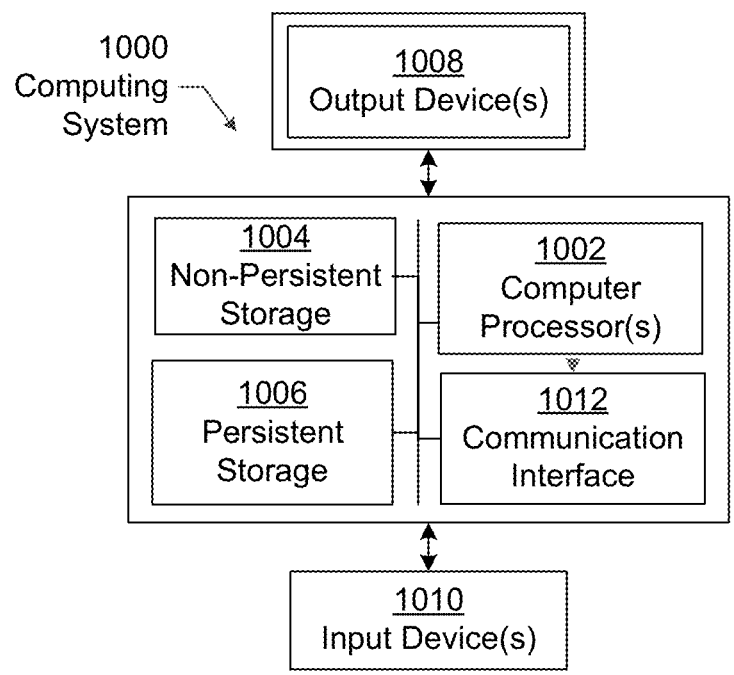
FIGS. 10A and 10B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 10A, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 10B:
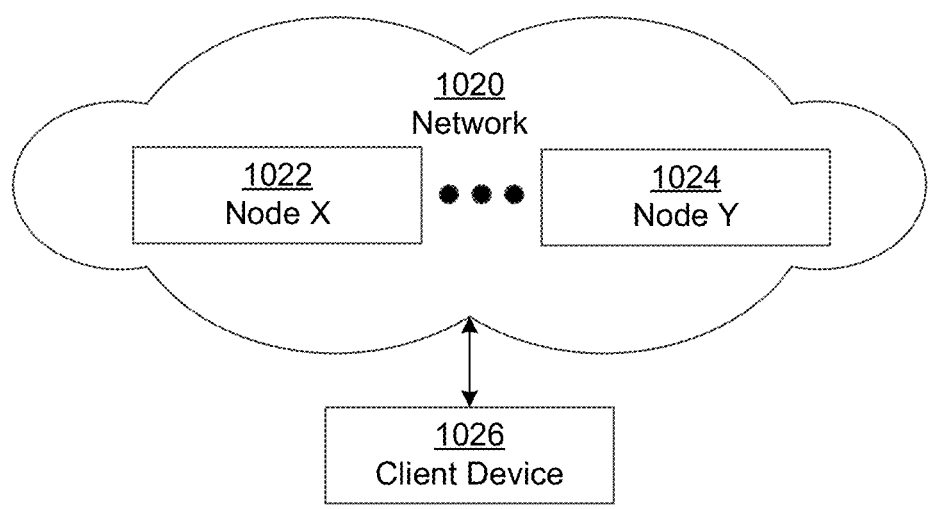

The computing system (1000) in FIG. 10A may be connected to or be a part of a network. For example, as shown in FIG. 10B, the network (1020) may include multiple nodes (e.g., node X (1022), node Y (1024)). Each node may correspond to a computing system, such as the computing system shown in FIG. 10A, or a group of nodes combined may correspond to the computing system shown in FIG. 10A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10A. Further, the client device (1026) may include and/or perform all or a portion of one or more embodiments of the disclosure.

The computing system or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 10A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 10A and the nodes and/or client device in FIG. 10B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting an unauthorized activity on a computer system, comprising:
    collecting a plurality of historical time stamps for a first type of access event related to the computer system;
    generating a time series from the plurality of historical time stamps representing historical counts of the first type of access event;
    selecting training data from the time series;
    selecting validation data from the time series;
    training, prior to obtaining the plurality of current time stamps, a first predictive model using the training data;
    obtaining a first predictive performance of the first predictive model using the validation data;
    training a second predictive model using the training data;
    obtaining a second predictive performance of the second predictive model using the validation data;
    selecting, based on the first predictive performance exceeding the second predictive performance, the first predictive model for predicting an expected count;
    obtaining a plurality of current time stamps for the first type of access event related to the computer system;
    determining a current count of the first type of access event using the plurality of current time stamps;
    predicting the expected count of the first type of access event using a current count of time stamps and the first predictive model;
    obtaining an actual count of the first type of access event;
    executing a first comparison of the actual count with the expected count;
    determining, based on a test comprising the first comparison, that the unauthorized activity on the computer system occurred; and
    issuing an alert indicating the unauthorized activity occurred.

2. The method of claim 1, further comprising:
    obtaining a plurality of current time stamps for a second type of access event related to the computer system;
    predicting an expected count of the second type of access event using the current count of time stamps for the second type of access event and a second third predictive model;
    obtaining an actual count of the second type of access event; and
    executing a second comparison of the actual count of the second type of access event with the expected count of the second type of access event,
    wherein the test further comprises the second comparison.

3. The method of claim 1, further comprising:
    at least partially blocking an access to the computer system in response to detecting the unauthorized activity.

4. The method of claim 1, wherein the first predictive model is one selected from a group consisting of an average model, a moving average model, a weighted average model, a Holt's linear trend method model, an autoregressive (AR) model, an autoregressive moving average (ARMA) model, an autoregressive integrated moving average (SARIMA) model, a nonlinear time series model, an artificial neural network (ANN) model, an extreme gradient boosting (XGboost) model, a k nearest neighbors (KNN) model, and support vector machines (SVM) model.

5. The method of claim 1, wherein the first type of access event is defined by:
    access to specified fields in a plurality of records stored in a data repository of the computer system.

6. The method of claim 1, wherein the first type of access event is defined by at least one selected from a group consisting of:
    a specified user requesting accessing the computer system,
    a specified software application accessing the computer system, and
    a specified application server accessing the computer system.

7. The method of claim 1, further comprising:
    obtaining a plurality current time stamps for a second type of access event related to the computer system;
    determining a current count of the second type of access event using the plurality current time stamps for the second type of access event; and
    determining whether the current counts for the first and the second types of access events are in conformity with a correlation model,
    wherein the correlation model is based on the plurality of historical time stamps for the first type of access event and a plurality of historical time stamps for the second type of access event, and
    wherein the test further comprises determining whether the current counts for the first and the second types of access events are in conformity with the correlation model.

8. The method of claim 1, wherein the first comparison is based on a confidence boundary obtained for the expected count.

9. A system for detecting an unauthorized activity involving a data repository, the system comprising:
    a hardware computer processor; and
    a monitoring service executing on the hardware computer processor configured to:
        collect a plurality of historical time stamps for a first type of access event related to the data repository;
        generate a time series from the plurality of historical time stamps representing historical counts of the first type of access event;
        select training data from the time series;
        select validation data from the time series;
        train, prior to obtaining the plurality of current time stamps, a first predictive model using the training data;
        obtain a first predictive performance of the first predictive model using the validation data;
        train a second predictive model using the training data;
        obtain a second predictive performance of the second predictive model using the validation data;
        select, based on the first predictive performance exceeding the second predictive performance, the first predictive model for predicting an expected count;

obtain a plurality of current time stamps for the first type of access event related to the data repository;

determine a current count of the first type of access event using the plurality of current time stamps;

predict an expected count of the first type of access event using a current count of time stamps and the first predictive model;

obtain an actual count of the first type of access event;

execute a first comparison of the actual count with the expected count;

determine, based on a test comprising the first comparison, that the unauthorized activity involving the data repository occurred; and issuing an alert indicating the unauthorized activity occurred.

10. The system of claim 9, wherein the monitoring service is further configured to:

at least partially block an access to the data repository in response to detecting the unauthorized activity.

11. The system of claim 9, wherein the first type of access event is defined by:

access to specified fields in a plurality of records stored in the data repository.

12. The system of claim 9, wherein the monitoring service is further configured to:

obtain a plurality of current time stamps for a second type of access event related to the data repository;

determine a current count of the second type of access event using the plurality of current time stamps for the second type of access event; and determine whether the current counts for the first and second types of access events are in conformity with a correlation model, wherein the correlation model is based on the plurality of historical time stamps for the first type of access event and a plurality of historical time stamps for the second type of access event, and wherein the test further comprises determining whether the current counts for the first and the second types of access events are in conformity with the correlation model.

13. A method for detecting an unauthorized activity on a computer system, comprising:

obtaining a plurality of current time stamps for a first type of access event related to the computer system;

determining a current count of the first type of access event using the plurality of current time stamps;

obtaining a plurality of current time stamps for a second type of access event related to the computer system;

determining a current count of the second type of access event using the plurality current time stamps for the second type of access event;

determining whether the current counts for the first and the second types of access events are in conformity with a correlation model wherein the correlation model is based on a plurality of historical time stamps for the first type of access event and the plurality of historical time stamps for the second type of access event, determining, based on a test whether the current counts for the first and the second types of access events are in conformity with the correlation model, that the unauthorized activity on the computer system occurred; and issuing an alert indicating the unauthorized activity occurred.

14. The method of claim 13, further comprising:

at least partially blocking an access to the computer system in response to detecting the unauthorized activity.

15. The method of claim 13, wherein the first type of access event is defined by:

access to specified fields in a plurality of records stored in a data repository of the computer system.

16. The method of claim 13, wherein the first type of access event is defined by at least one selected from a group consisting of:

a specified user requesting accessing the computer system, a specified software application accessing the computer system, and a specified application server accessing the computer system.

* * * * *